United States Patent
Ferrarini

(10) Patent No.: US 6,913,776 B2
(45) Date of Patent: Jul. 5, 2005

(54) PROCESS AND PLANT FOR THE SEPARATION OF UNDESIRABLE SUBSTANCES FROM ALIMENTARY LIQUIDS, IN PARTICULAR FROM WINE

(75) Inventor: Roberto Ferrarini, Fumane (IT)

(73) Assignee: Enologica Vason S.r.l., Pedemonte (IT)

( * ) Notice: Subject to any disclaimer, the term of this patent is extended or adjusted under 35 U.S.C. 154(b) by 0 days.

(21) Appl. No.: 10/443,112

(22) Filed: May 22, 2003

(65) Prior Publication Data

US 2003/0235640 A1 Dec. 25, 2003

Related U.S. Application Data

(63) Continuation-in-part of application No. PCT/IT02/00472, filed on Jul. 18, 2002.

(30) Foreign Application Priority Data

Jul. 31, 2001 (IT) ...................................... VI2001A0161

(51) Int. Cl.[7] ................................................. C12H 1/00
(52) U.S. Cl. .................... 426/330.4; 426/425; 426/431; 426/592; 210/644
(58) Field of Search ............................ 426/330.4, 425, 426/431, 592, 16, 422; 210/644

(56) References Cited

U.S. PATENT DOCUMENTS

| | | | |
|---|---|---|---|
| 3,979,521 A | | 9/1976 | Sakaguchi et al. |
| 4,205,092 A | | 5/1980 | Mattick et al. |
| 4,401,678 A | | 8/1983 | Beaumont |
| 4,681,767 A | | 7/1987 | Weiss |
| 4,888,189 A | | 12/1989 | Gnekow |
| 4,999,209 A | | 3/1991 | Gnekow |
| 5,143,526 A | * | 9/1992 | Lee et al. ................. 210/195.2 |
| 5,480,665 A | | 1/1996 | Smith |
| 5,817,359 A | | 10/1998 | Michaels et al. |

FOREIGN PATENT DOCUMENTS

| | | |
|---|---|---|
| DE | 41 09 080 C1 | 11/1992 |
| FR | 2 653 443 A1 | 4/1991 |
| GB | 2 133 418 A | 7/1994 |
| IT | 01242865 | 5/1994 |
| IT | 01242866 | 5/1994 |
| IT | 01249187 | 2/1995 |
| WO | WO 87/03902 A1 | 7/1987 |
| WO | WO 92/08783 | 5/1992 |
| WO | WO 93/08257 A1 | 4/1993 |
| WO | WO 93/22036 A1 | 11/1993 |

* cited by examiner

Primary Examiner—Curtis E. Sherrer
(74) Attorney, Agent, or Firm—Browdy and Neimark, P.L.L.C.

(57) ABSTRACT

Plant for the separation of undesirable substances from alimentary liquids, in particular from wine, which comprises a unit (3) with hydrophobic membranes (4) having holes (5) for trapping gas (G), supplied with wine to be treated (V) by means of first circulation means (6) and with an extraction fluid (L) having an alcoholic content substantially similar to that of the wine to be treated (V), by means of second circulation means (7). The two fluids pass along the two sides (4',4") of the membranes (4), allowing the removal of the undesirable volatile substances which pass through the latter. The extraction fluid (L) is made to circulate by the second means (7) inside a purification circuit (8) which comprises a unit (9) for separation of the volatile substances, consisting preferably of an ion-exchange column. The process implemented in particular by the abovementioned plant envisages a step involving preparing the wine to be treated (V) inside a container (2), a subsequent step involving conveying to the abovementioned unit (3) and then a step involving removal of the undesirable volatile substances contained therein by means of evaporation, diffusion and consequent evaporation thereof which causes them to pass through the membranes (4) so as to be then evacuated by the extraction fluid (L) by means of ion-exchange resins, distillation, adsorption onto polymers or other system.

10 Claims, 2 Drawing Sheets

PROCESS AND PLANT FOR THE SEPARATION OF UNDESIRABLE SUBSTANCES FROM ALIMENTARY LIQUIDS, IN PARTICULAR FROM WINE

This is a continuation-in-part of copending parent application No. PCT/IT02/100472, filed Jul. 18, 2002.

TECHNICAL FIELD

The present invention concerns a process and a plant for the separation of undesirable substances from alimentary liquids, in particular from wine. The invention in question is intended to be advantageously used in the oenology sector for the refinement of wine, namely in order to the improve the organoleptic properties and taste thereof or reduce certain components which are present in excessive amounts.

BACKGROUND ART

At present, as is known, the wine industry makes widespread use of microfiltration plants, or submicronic filtration (ultrafiltration or nanofiltration) plants, which use semipermeable membranes generally formed by thin polymer films in order to separate some components from others.

The passage of the wine to be filtered through the membrane is usually obtained by means of mechanical overpressure. These membrane-type filtration plants have major operational limitations in that they do not allow the separation of all the undesirable components, for example because of their dimensions which in some cases are excessively small, their polarity or their surface tension. These plants, therefore, are suitable only for implementing given filtration processes of the type for example described in the patents IT 1,249,187 and IT 1,242,866.

Moreover, numerous plants based on the principle of (direct or reverse osmosis) are known, said plants being able to achieve, by means of a semipermeable membrane, purification of solutions, separating a permeated fraction from a retained fraction. Reverse osmosis in particular is a known dual-action process which allows, on the one hand, the purification of solutions, eliminating undesirable substances (for example salts) and, on the other hand, the concentration of solutions, extracting water or other solvent from the initial product.

In the oenology sector, reverse osmosis is currently used in methods for concentrating wine or fruit juices with a low sugar content, as described in the U.S. Pat. No. 3,979,521, or in order to extract volatile esters with a low molecular weight (such as, for example, methyl-anthranilate) from wine or must, as described in the U.S. Pat. No. 4,401,678, or in order to remove water or a more or less important part of alcohol from wine as described in the patents U.S. Pat. No. 4,999,209, U.S. Pat. No. 4,888,189, U.S. Pat. No. 4,681,767, FR 2,653,443, GB 2,133,418, IT 1,242,865, WO/03902 and WO/08783.

A method and an apparatus for the treatment of fluids and in particular wine, able to separate a retained fraction from a permeated fraction in a reverse osmosis unit, is also known from the U.S. Pat. No. 5,480,665. The latter receives inside it the undesirable substances such as, for example, the volatile acidity components (ethyl acetate and acetic acid) which are then removed by means of a subsequent treatment. For this purpose, the permeated fraction is passed through an adsorbent column able to remove the acetic acid by means of anion-exchange resins and the ethyl acetate by means of hydrolysis.

With this treatment it is therefore possible to purify, of the undesirable substances, the permeated fraction which is then reintroduced into the wine, obtaining a final product which is substantially devoid of volatile acidity. Advantageously, this method envisages also treating the permeated fraction with a low-temperature distillation process in order to remove $CO_2$, $H_2S$, acetaldehyde or other volatile components.

Methods for treating wine in order to lower the total acidity by means of ion-exchange resin columns are per se already known and for example described and illustrated in the U.S. Pat. No. 4,205,092.

The processes for separation of undesirable substances briefly described hitherto have in practice proved to be unsatisfactory in terms of performance. In other words, with these processes and associated plants it is not possible to select adequately only the undesirable substances, and therefore inevitably also substances—which instead make a positive contribution to the quality of the wine—are removed together therewith.

DISCLOSURE OF THE INVENTION

In this situation the task underlying the present invention is to eliminate the drawbacks of the abovementioned prior art by providing a process and a plant for the separation of undesirable substances from alimentary liquids, in particular from wine, which allow an improvement in the quality of the product obtained by means of an improved action involving selective purification of only the undesirable substances.

Another object of the present invention is that of providing a process and a plant for the separation of undesirable substances from alimentary liquids, in particular from wine, which is constructionally simple and operationally entirely reliable.

These and other objects are all achieved by a process for the separation of undesirable substances from alimentary liquids, in particular from wine, which is characterized in that it comprises the operating steps of: preparing a wine to be treated inside a container; conveying the wine to be treated to a filtration unit provided with hydrophobic membranes having holes for trapping gas and able to be passed along, on a first side, by the wine to be treated and, on a second side, by an extraction fluid having an alcoholic content substantially similar to that of the wine to be treated and made to circulate in a purification circuit; removal of undesirable volatile substances from the wine to be treated by means of evaporation and subsequent diffusion thereof in the gas trapped in the membranes and consequent condensation of the volatile substances on the second side of the membranes, with the formation of a contaminated fluid formed by the extraction fluid and the permeated volatile substances and a retained fraction formed by the treated wine purified of the permeated volatile substances.

According to the invention the said objects are also achieved by means of a plant for the separation of undesirable substances from alimentary liquids, in particular from wine, characterized in that it comprises a container for the wine to be treated, a filtration unit provided with hydrophobic membranes having holes for trapping gas, first circulation means for conveying the wine to be treated through the filtration unit, causing it pass along a first side of the membranes; second circulation means for causing the flow of an extraction fluid having an alcoholic content substantially similar to that of the wine to be treated in a purification circuit through the filtration unit, causing it to pass along the second side of the membranes; the membranes removing from the wine to be treated the undesirable volatile substances by means of evaporation and subsequent diffusion thereof in the gas trapped in the membranes and consequent condensation thereof on the second side of the membranes, with the formation of a contaminated fluid formed by the extraction fluid enriched with the permeated volatile substances, and a retained fraction formed by the treated wine purified of the volatile substances; the purification circuit supplying by means of the second circulation means at least one unit for separation of the volatile substances from the contaminated fluid.

This process and this plant allow an effective improvement in the quality of the wine treated and are particularly suitable for use with wines having an excessive volatile acidity content.

BRIEF DESCRIPTION OF THE DRAWINGS

The technical characteristics of the invention, in accordance with the abovementioned objects, may be clearly determined from the contents of the claims below and the advantages thereof will emerge more clearly from the detailed description which follows, with reference to the accompanying drawings, which show a purely exemplary non-limiting example of embodiment thereof and in which:

DETAILED DESCRIPTION OF A PREFERRED EXAMPLE OF EMBODIMENT

Figure 1:
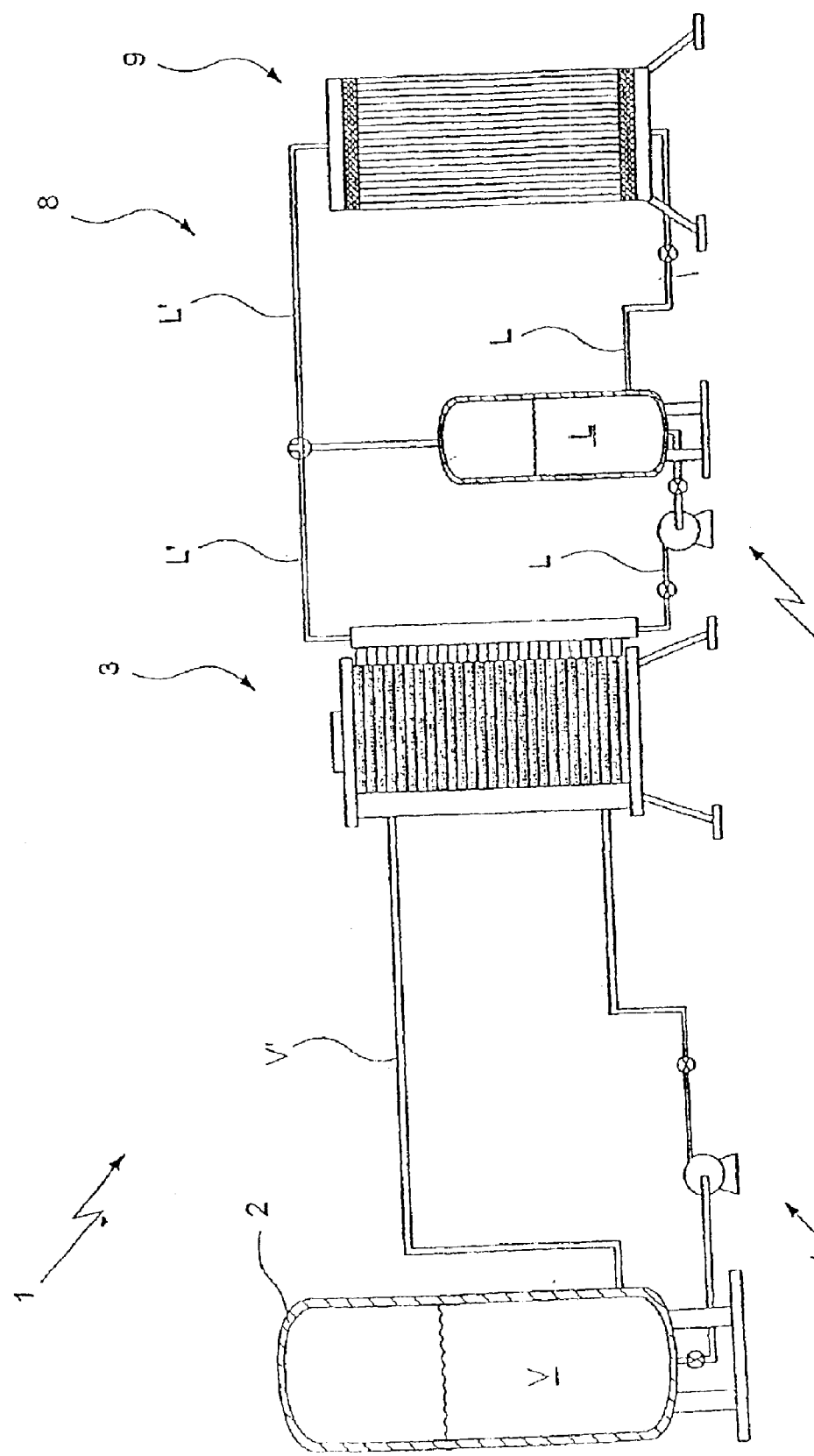
FIG. 1 shows a functional logic diagram of the process and the plant for the separation of undesirable substances from alimentary liquids, in particular from wine, according to the present invention.

With reference to the accompanying figures, 1 denotes in its entirety the plant for implementing a process for the separation of undesirable substances from alimentary liquids, in particular from wine, according to the present invention.

This plant 1 is intended to be used in the food industry in general, and in particular in the oenology sector, in order to treat a very large number of different types of alimentary liquids. Below, for the sake of simplicity of the description, reference will be made only to the example of an oenological product such as wine or wine must, without, as a result, the use of this plant with other alimentary liquids departing from the protective scope of the present patent.

The plant 1 essentially comprises a container 2 for wine to be treated V, a unit 3 which has hydrophobic membranes 4 with holes 5 for trapping a gas G and the function and structure of which will be described more clearly below, and first circulation means 6 for causing the wine V to flow through the unit 3, causing it to pass along a first side 4' of the membranes 4.

The second side 4" of the membranes 4 is instead passed along by an extraction fluid L which is conveyed by second circulation means 7 inside a closed purification circuit 8. The extraction fluid L consists of a liquid solution having an alcoholic content substantially similar to that of the wine V which can be obtained, for example, as will be seen below, also with a part of wine devoid of undesirable substances.

The membranes 4, which are of the type marketed for example by GORE TEX or PALL and already known in the industrial sector and in the medical field, are hydrophobic, i.e. consist of hydrophobic polymers with a high molecular weight, generally polypropylene or polytetrafluoroethylene, forming a three-dimensional structure with pores having a diameter preferably in the region of a tenth of a micrometer able to retain inside them gas, generally consisting of air. This structure, as is known, is impermeable to water, but permeable to gases. These same membranes made of hydrophobic material (permeation membranes) differ from each generally in terms of thickness, permeability to air, diameter of the pores, etc.

Figure 2:
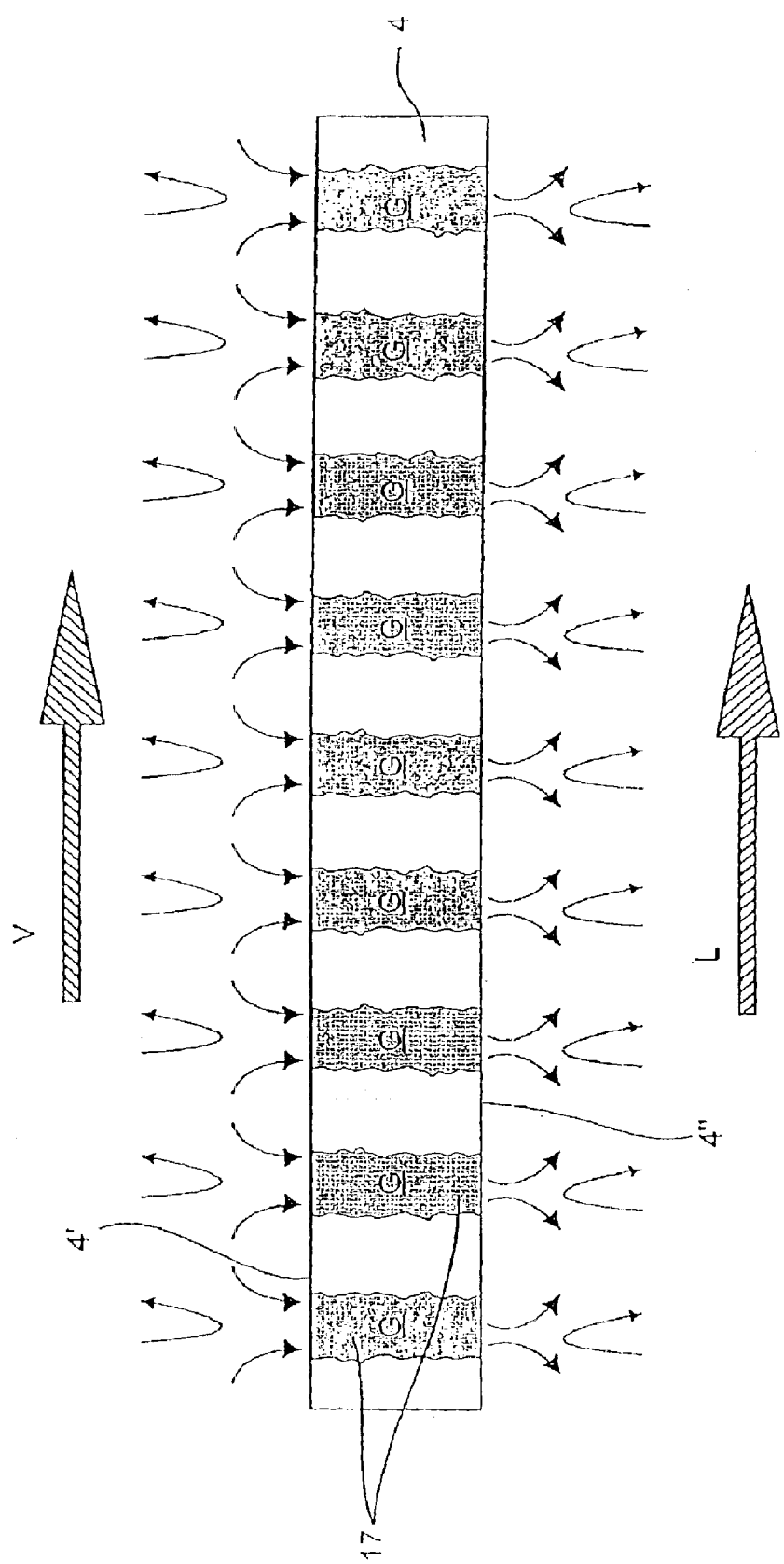
FIG. 2 is a schematic illustration of the operating principle of the hydrophobic membranes used in the process and in the plant in question.

FIG. 2 shows in schematic form a membrane 4 of the type mentioned above, which is passed along tangentially, on both sides 4', 4", by the wine V and the extraction fluid L, respectively.

The passage, from one side to the other of the membrane 4, of one or more substances occurs substantially in accordance with the principle of (direct) osmosis whereby a semipermeable membrane placed so as to make contact with and separate two solutions having a solute with different concentration allows, in given conditions, the through-flow of solvent from one side to the other of the membrane so as to re-establish an equal concentration in the two solutions.

In the plant 1 and in the process in question, however, the membranes 4 of the type described above do not participate directly in the removal of the undesirable substances by means of a selective action due to their intrinsic characteristics, as instead occurs in the case where osmotic membranes are used.

The membranes 4 used in the process and in the plant according to the present invention regulate the through-flow of the undesirable volatile substances which are present in the wine in a greater concentration than in the extraction fluid L by means a complex mechanism illustrated schematically in FIG. 2. This mechanism, which is known per se, envisages the evaporation of one or more undesirable volatile substances (for example acetic acid, ethyl acetate, acetaldehyde, volatile substances with an undesirable odour, etc.) on the first side 4' of the membrane 4, the diffusion therefore inside the gas G retained in the pores 5 and then the condensation thereof on the second side 4" of the membrane 4 so as to then be evacuated by the extraction fluid circulating in the purification circuit 8.

In accordance with the physical principle forming the basis of operation of the membrane, the through-flow of the volatile substances is regulated by the value of the partial pressures of the individual components in the two liquids on the sides of the membrane.

The action of the membrane 4 basically results in the formation of a contaminated fluid L', which is composed of the extraction fluid L enriched with the volatile substances which have passed through the membrane 4, and a retained fraction composed of the treated wine V' purified of the volatile substances.

At this point, in accordance with the diagram of the plant illustrated in FIG. 1, the contaminated fluid L' which advances in the purification circuit 8 is made to pass through a separation unit 9 having the purpose of eliminating the volatile substances and regenerating in this way the extraction fluid L.

Advantageously the separation unit 9 may be formed by means of an anion-exchange resin filtration column (as indicated in FIG. 1) particularly suitable for removing acetic acid and/or ethyl acetate by means of basic sites having an electrostatic action with for example NH3+ groups. Alternatively or in parallel the contaminated fluid L' may also be sent to a distillation column (not shown since it is of a type known per se) in order to extract acetaldehyde, or $H_2S$, or certain volatile esters responsible for unpleasant aromas. Obviously, the purification of the contaminated fluid may also be obtained by means of filtration processes involving ion-exchange resins or using other methods such as adsorption onto polymers, extraction with solvents, or the like.

The present invention also relates to a process for the separation of undesirable substances from alimentary liquids—in particular able to be implemented by means of the plant 1 described above—which is illustrated in the accompanying FIG. 1.

Operationally speaking, it comprises according to the invention the steps of preparing the wine V to be treated inside the container 2, subsequent conveying of a flow of this wine V into the unit 3 described above and consequent removal therefrom of the undesirable volatile substances by means of the passage of the said substances through the hydrophobic membranes 4 in the manner described above. These steps thus result in the formation of a contaminated fluid L' composed of the extraction fluid L and the undesirable volatile substances and a retained fraction formed by the treated wine V' purified of the said undesirable volatile substances.

At this point, the final step of re-introduction of the treated wine V' into the container 2 follows. This cycle is repeated until, inside the container, there is a concentration of the individual undesirable substances which is sufficiently low, for example less than a predetermined threshold value.

Advantageously, in accordance with a further characteristic feature of the present process, the contaminated fluid L' is again subjected to a step involving conveying into the separation unit 9 indicated above, where it undergoes a step involving removal of the undesirable volatile substances. This is then followed by a step involving re-introduction of the regenerated extraction fluid L inside the purification circuit 8.

The step involving removal of the volatile substances from the extraction fluid L may be obtained by means of an ion-exchange process or by means of a distillation process.

Advantageously, the extraction fluid L may consist of a fluid, such as water for example, initially devoid of a concentration of alcohol and/or volatile substances (i.e. both as regards their positive portion—such as aromas associated with the bouquet of the wine—and as regards their negative portion—such as volatile acidity or unpleasant odours). Said fluid is contained in the second circulation means 7, which may comprise for this purpose a storage tank 7'. The quantity of extraction fluid L must be in any case less than that envisaged for the wine V and preferably must not exceed the ratio of 1/50th of the quantity of wine V.

In this way, after an initial phase of extraction, from the wine V, of alcohol and all the volatile substances which manage to pass through the unit 3 described above, an equilibrium is rapidly reached for all those substances, removal of which in the separation unit 9 is not envisaged.

Under operating conditions, once the abovementioned equilibrium has been reached, the substances which continue to pass through the unit 3 will be only those which are continuously extracted by the separation unit 9.

For this purpose, the action of the separation unit 9 may be calibrated precisely, for example using specific ion or cation exchange columns, also for removal of individual undesirable aromas. In any case, the separation unit 9 does not per se produce essentially any extraction of alcohol, the equilibrium of which is therefore rapidly reached, such that it may be stated that the plant functions (under operating conditions) with the extraction fluid L having a concentration of alcohol substantially similar to that of the wine to be treated V.

In accordance with the accompanying figures for the example considered, the tank 7' has dimensions which are considerably smaller than those of the container 2'.

Advantageously the extraction fluid L may consist directly of wine in the small quantity envisaged and preferably in any case less than 1/50th of the quantity of wine V.

The measure of using the extraction fluid L, be it water, wine or the like, as the intermediate liquid, for removal of undesirable substances from the wine V basically results in the possibility of not contaminating directly the wine V by causing it pass, with direct contact, through ion-exchange columns.

This also results in a greater degree of freedom as regards the choice of materials assigned for extraction of undesirable substances by the extraction fluid L and envisaged in the separation unit 9.

In view of the disproportion between the liters of wine and liters of extraction fluid L, the initial dilution of alcohol or other volatile substances intended to reach rapidly the equilibrium has only a negigible impact on the characteristics of the wine contained in the container 2.

The invention thus conceived therefore achieves the predefined objects.

What is claimed is:

1. Process for the separation of undesirable substances from wine, said undesirable substances comprising one or more of acetic acid, ethyl acetate, acetaldehyde, sulphur dioxide, and sulphurated organic compounds, said process comprising:

preparing wine to be treated (V) inside a container (2);

conveying said wine (V) to be treated to a unit (3) with at least one porous hydrophobic membrane (4) having holes (5) for trapping gas (G) and able to be passed along, on a first side (4') of said hydrophobic membrane, by said wine to be treated (V) and, on a second side (4") of said membrane, by an extraction liquid (L) having an alcoholic content similar to that of said wine (V) to be treated and made to circulate inside a purification circuit (8);

removing undesirable volatile substances from said wine to be treated (V) by evaporation on said first side (4') of the membrane (4) and subsequent diffusion thereof in said gas (G) trapped in said membrane (4) and consequent condensation of said volatile substances on said second side (4") of the membrane (4), with the formation of a contaminated liquid (L') which is formed by said extraction liquid (L) and by the permeated volatile substances, and a retained fraction which is formed by said treated wine (V') purified of said permeated volatile substances;

conveying said contaminated liquid (L') into a separation unit (9) by said purification circuit (8);

removing in said separation unit (9) said volatile substances from said contaminated liquid (L') with consequent regeneration of said extraction liquid (L) and obtaining a regenerated extraction liquid (L);

re-introducing said regenerated extraction liquid (L) into said purification circuit (8);

the quantity of said extrction liquid (L) not exceeding the ratio of $1/50^{th}$ of the quantity of said wine to be treated (V).

2. Process according to claim 1, characterized in that it also comprises the step of re-introducing said treated wine (V') into said container (2).

3. Process according to claim 1, characterized in that said extraction liquid (L) consists of wine substantially free of said undesirable substances.

4. Process according to claim 1, characterized in that said step of removing said volatile substances from said contaminated fluid (L') is obtained by ion exchange.

5. Process according to claim 1, characterized in that said steps are repeated cyclically.

6. Process according to claim 2, characterized in that said steps are repeated cyclically.

7. Process according to claim 1, characterized in that said porous membrane (4) is formed of a hydrophobic polymer-with a high molecular weight.

8. Process for the separation of undesirable substances from wine, said undesirable substances comprising one or more of acetic acid, ethyl acetate, acetaldehyde, sulphur dioxide, and sulphurated organic compounds, said process comprising:

preparing wine to be treated (V) inside a container (2);

conveying said wine (V) to be treated to a unit (3) with at least one hydrophobic porous membrane (4) having holes (5) for trapping gas (G) and able to be passed along, on a first side (4') thereof, by said wine to be treated (V) and, on a second side (4") thereof, by an extraction liquid (L) having an alcoholic content lower than that of said wine (V) to be treated and made to circulate inside a purification circuit (8);

removing undesirable volatile substances from said wine to be treated (V) by evaporation on said first side (4') of the membrane (4) and subsequent diffusion thereof in said gas (G) trapped in said membrane (4) and consequent condensation of said volatile substances on said second side (4") of the membrane (4), with the formation of a contaminated liquid (L') which is formed by said extraction liquid (L) and by the permeated volatile substances, and a retained fraction which is formed by said treated wine (V') purified of said permeated undesirable volatile substances;

conveying said contaminated liquid (L') into a separation unit (9) by means of said purification circuit (8);

removing in said separation unit (9) said undesirable volatile substances from said contaminated liquid (L') with consequent regeneration of said extraction fluid (L) and thus obtaining a regeneration extraction liquid (L);

re-introducing said regenerated extraction liquid (L) into said purification circuit (8);

said removing undesirable substances from said wine to be treated (V) comprising an initial step involving extraction, from said wine to be treated (V), by said extraction liquid (L) through said unit (3) with at least one hydrophobic porous membrane (4), of alcohol and/or a portion of volatile substances which are not in equilibrium between said wine to be treated (V) and said extraction liquid (L) and are not able to be removed by said separation unit (9), said initial step involving extraction lasting until a equilibrium in alcohol and/or said fraction of volatile substances is reached between said wine to be treated (V) and said extraction liquid (L), the quantity of said extraction liquid (L) circulating in said purification circuit (8) not exceeding the ratio of $1/50^{th}$ of the quantity of said wine to be treated.

9. Process according to claim 8, characterized in that said extraction liquid (L) is water or wine.

10. The process of claim 4, wherein said ion exchange is anion exchange.

* * * * *